United States Patent [19]

Stafford

[11] 3,810,115

[45] May 7, 1974

[54] POSITION SCALER (SHIFTER) FOR COMPUTER ARITHMETIC UNIT

[75] Inventor: John P. Stafford, Oklahoma City, Okla.

[73] Assignee: Honeywell Information Systems, Inc., Waltham, Mass.

[22] Filed: Feb. 5, 1973

[21] Appl. No.: 329,805

[52] U.S. Cl. .............................................. 340/172.5
[51] Int. Cl. .......................... G06f 7/00, G11c 19/00
[58] Field of Search .................................. 340/172.5

[56] References Cited

UNITED STATES PATENTS

| | | | |
|---|---|---|---|
| 3,436,737 | 4/1969 | Iverson et al. | 340/172.5 |
| 3,510,846 | 5/1970 | Goldschmidt et al. | 340/172.5 |
| 3,596,251 | 7/1971 | Buchan et al. | 340/172.5 |
| 3,659,274 | 4/1972 | Kyser | 340/172.5 |

*Primary Examiner*—Raulfe B. Zache
*Attorney, Agent, or Firm*—James A. Pershon

[57] ABSTRACT

The information bit position scaler or shifter includes logic for shifting eight binary bits of information, bidirectionally, either right or left from one to eight positions, with zero fill, or in a circular mode. The position scaler includes a shift selection unit and units providing layers of shifts of four, two and one. The highest number of shifts are performed first in the shift by four unit, with the direction selection controlling only this unit.

9 Claims, 4 Drawing Figures

| | R | L | N1 | N2 | N3 | OPER. | B1 | B2 | B3 | B4 | B5 | B6 | B7 | B8 |
|---|---|---|---|---|---|---|---|---|---|---|---|---|---|---|
| SHIFT RIGHT | 1 | 0 | 0 | 0 | 0 | R0 | A1 | A2 | A3 | A4 | A5 | A6 | A7 | A8 |
| | 1 | 0 | 0 | 0 | 1 | R1 | — | A1 | A2 | A3 | A4 | A5 | A6 | A7 |
| | 1 | 0 | 0 | 1 | 0 | R2 | — | — | A1 | A2 | A3 | A4 | A5 | A6 |
| | 1 | 0 | 0 | 1 | 1 | R3 | — | — | — | A1 | A2 | A3 | A4 | A5 |
| | 1 | 0 | 1 | 0 | 0 | R4 | — | — | — | — | A1 | A2 | A3 | A4 |
| | 1 | 0 | 1 | 0 | 1 | R5 | — | — | — | — | — | A1 | A2 | A3 |
| | 1 | 0 | 1 | 1 | 0 | R6 | — | — | — | — | — | — | A1 | A2 |
| | 1 | 0 | 1 | 1 | 1 | R7 | — | — | — | — | — | — | — | A1 |
| CIRCULAR MODE | 1 | 1 | 0 | 0 | 0 | R0, L0 | A1 | A2 | A3 | A4 | A5 | A6 | A7 | A8 |
| | 1 | 1 | 0 | 0 | 1 | R1, L7 | A8 | A1 | A2 | A3 | A4 | A5 | A6 | A7 |
| | 1 | 1 | 0 | 1 | 0 | R2, L6 | A7 | A8 | A1 | A2 | A3 | A4 | A5 | A6 |
| | 1 | 1 | 0 | 1 | 1 | R3, L5 | A6 | A7 | A8 | A1 | A2 | A3 | A4 | A5 |
| | 1 | 1 | 1 | 0 | 0 | R4, L4 | A5 | A6 | A7 | A8 | A1 | A2 | A3 | A4 |
| | 1 | 1 | 1 | 0 | 1 | R5, L3 | A4 | A5 | A6 | A7 | A8 | A1 | A2 | A3 |
| | 1 | 1 | 1 | 1 | 0 | R6, L2 | A3 | A4 | A5 | A6 | A7 | A8 | A1 | A2 |
| | 1 | 1 | 1 | 1 | 1 | R7, L1 | A2 | A3 | A4 | A5 | A6 | A7 | A8 | A1 |
| SHIFT LEFT | 0 | 1 | 0 | 0 | 0 | L0 | — | — | — | — | — | — | — | — |
| | 0 | 1 | 0 | 0 | 1 | L7 | A8 | — | — | — | — | — | — | — |
| | 0 | 1 | 0 | 1 | 0 | L6 | A7 | A8 | — | — | — | — | — | — |
| | 0 | 1 | 0 | 1 | 1 | L5 | A6 | A7 | A8 | — | — | — | — | — |
| | 0 | 1 | 1 | 0 | 0 | L4 | A5 | A6 | A7 | A8 | — | — | — | — |
| | 0 | 1 | 1 | 0 | 1 | L3 | A4 | A5 | A6 | A7 | A8 | — | — | — |
| | 0 | 1 | 1 | 1 | 0 | L2 | A3 | A4 | A5 | A6 | A7 | A8 | — | — |
| | 0 | 1 | 1 | 1 | 1 | L1 | A2 | A3 | A4 | A5 | A6 | A7 | A8 | — |

POSITION SCALER (SHIFTER) FOR COMPUTER ARITHMETIC UNIT

BACKGROUND OF THE INVENTION

This invention relates generally to a calculating unit performing arithmetic functions and more specifically to an improved position scaler or shifter.

1. Field of the Invention

In present-day data processing systems, the shifting or position scaling of information bits to perform arithmetic or logical functions is commonplace. The shifting of bit positions from the most significant bit position to a lesser bit position and from a least significant bit position to a higher position is a necessity to perform arithmetic functions such as multiplication and division.

2. Description of the Prior Art

The prior art position scalers included logic for either shifting information bits from the most significant bit position to the least significant bit position, a right shift, or the shift of information bits from the least significant bit position to a higher or the most significant bit position, a left shift, or by combining the separate shifting functions to accomplish a circular shift.

Prior art devices used complicated logic circuitry including bistable devices in the form of shifting registers to accomplish the shifting function.

In most data processing systems speed is of the utmost importance. Therefore, the decreasing of the logical functions was not the most important criteria. However, the trend now is to perform the computing functions in the smallest space possible for low-cost computing terminals, such as point of sale terminals.

SUMMARY OF THE INVENTION

The information bit shifter or position scaler according to the present invention provides the functions in one unit of shifting right from most significant bit position to least significant bit position, a shift left from least significant bit position to most significant bit position, and a circular shift using a lesser number of logical gates than formerly required. The highest number of shifts required is performed first, with the direction selection controlling only the highest shift unit. The number of concurrent signal activated logic gates for each section is computed. The control of these logic gates in the highest shift unit is also computed. A truth table using the original and eventual shift position is used to combine the concurrent signal activated logic gates into an alternate signal operated logic gate, whose output signals in turn are directed to the next highest number of shift unit.

The number of logic gates in the next highest number of shift unit is computed and combined using the truth table. This is repeated until the output signals have essentially been directly through shift units presenting the maximum number of shifts necessary to shift the most significant bit to the least significant bit position or vice versa.

It is, therefore, an object of the present invention to provide enhanced apparatus for position scaling information bits.

It is another object of the present invention to provide a eight-bit position scaler using a lesser number of logic gates than previously required.

It is yet another object to provide a power of 2 information bit scaler that can shift right any number of shifts from one to the number necessary to move the most significant digit to the least significant digit position, can shift left any number of positions from one to the number required to move the least significant digit to the most significant digit position, and can also shift in a circular mode.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

DESCRIPTION OF THE PREFERRED EMBODIMENT

Figures 1, 3:
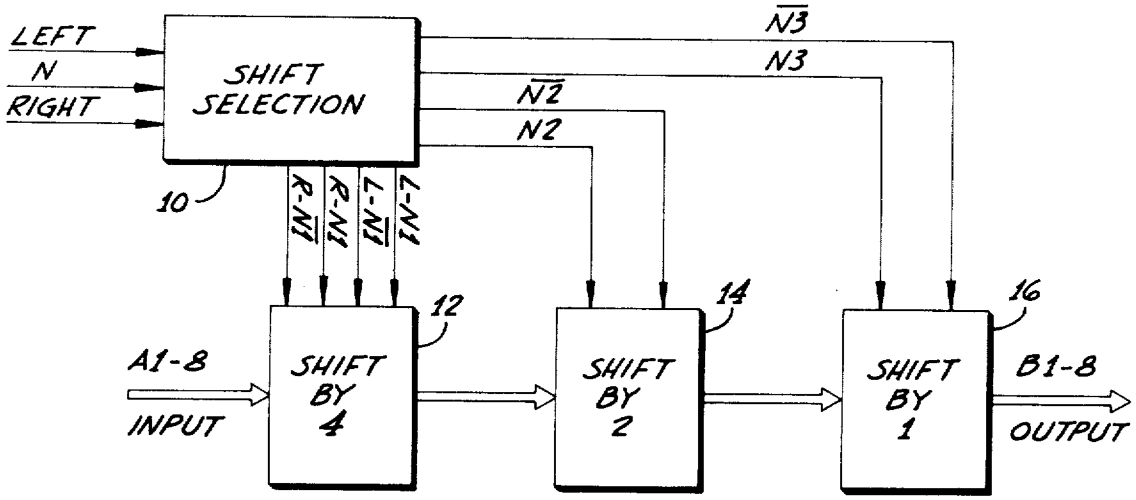
FIG. 1 is a block diagram of an eight-bit position scaler according to the present invention.
FIG. 3 is a truth table for an eight-bit position scaler showing the resultant bit position after shifting according to the actuation by the shift selection and the block diagram of FIG. 1.

Referring to FIG. 1, a block diagram of an eight-bit, 2 to the third power, position scaler or shifter according to the present invention is shown. The position scaler comprises a shift selection unit 10, a shift by four unit 12, a shift by two unit 14, and a shift by one unit 16. The shift selection unit 10 takes the commands such as the left and right signals and the number of shifts required, the N1, N2, and N3 signals, and in turn actuates the required shift units. An eight-bit shifter is disclosed according to the preferred embodiment and thus eight bits of information, A1–8, are transmitted to the shift by four unit 12. The input A1–8 signals are directed through the shifting units to become the output information bits, B1–B8 signals.

The position scaler according to the present invention is capable of shifting in a bidirectional mode either right or left by performing selective shifts with zero fill or in a circular mode. The position scaler according to the preferred embodiment can shift eight bits of information a maximum of seven shifts by selectively activating the shift by four unit 12, the shift by two unit 14, and the shift by one unit 16. The shift command, the N signals, activates the shift selection unit 10 according to the required shifting instruction. The mode is then selected either left or right shift by enabling the left or right signal respectively. If a circular mode is required, both the left and the right signals are placed in a high or activated position. In the present embodiment, a high or activated signal will be represented by a "1" and a low or disabled signal will be represented by a "0."

The shift selection unit 10 activates any one or all of the three shifting units. The bits of data information from the input are transmitted into the shift by four unit 12 first and from the shift by four unit 12 into the shift by two unit 14 and on into the shift by one unit 16 to the output. The path is taken whether the shift by four or the shift by two units are activated or not. The mode or shift direction signals, right or left, control only the highest shift unit, the shift by four unit 12 of the preferred embodiment.

Figure 2A:
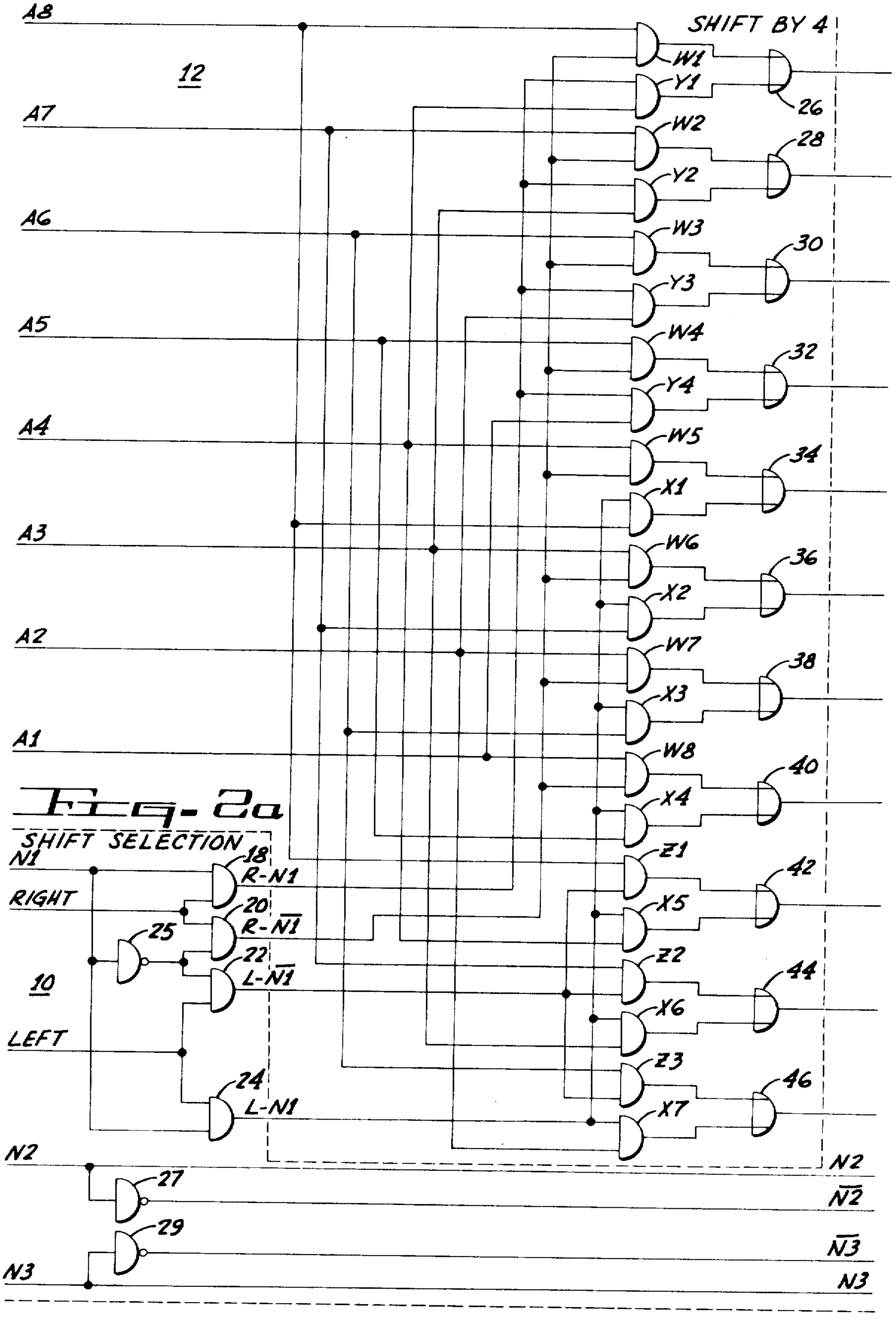
FIGS. 2*a* and 2*b* are a logic diagram divided into blocks showing the logic circuitry inside the blocks according to FIG. 1.
Figure 2B:
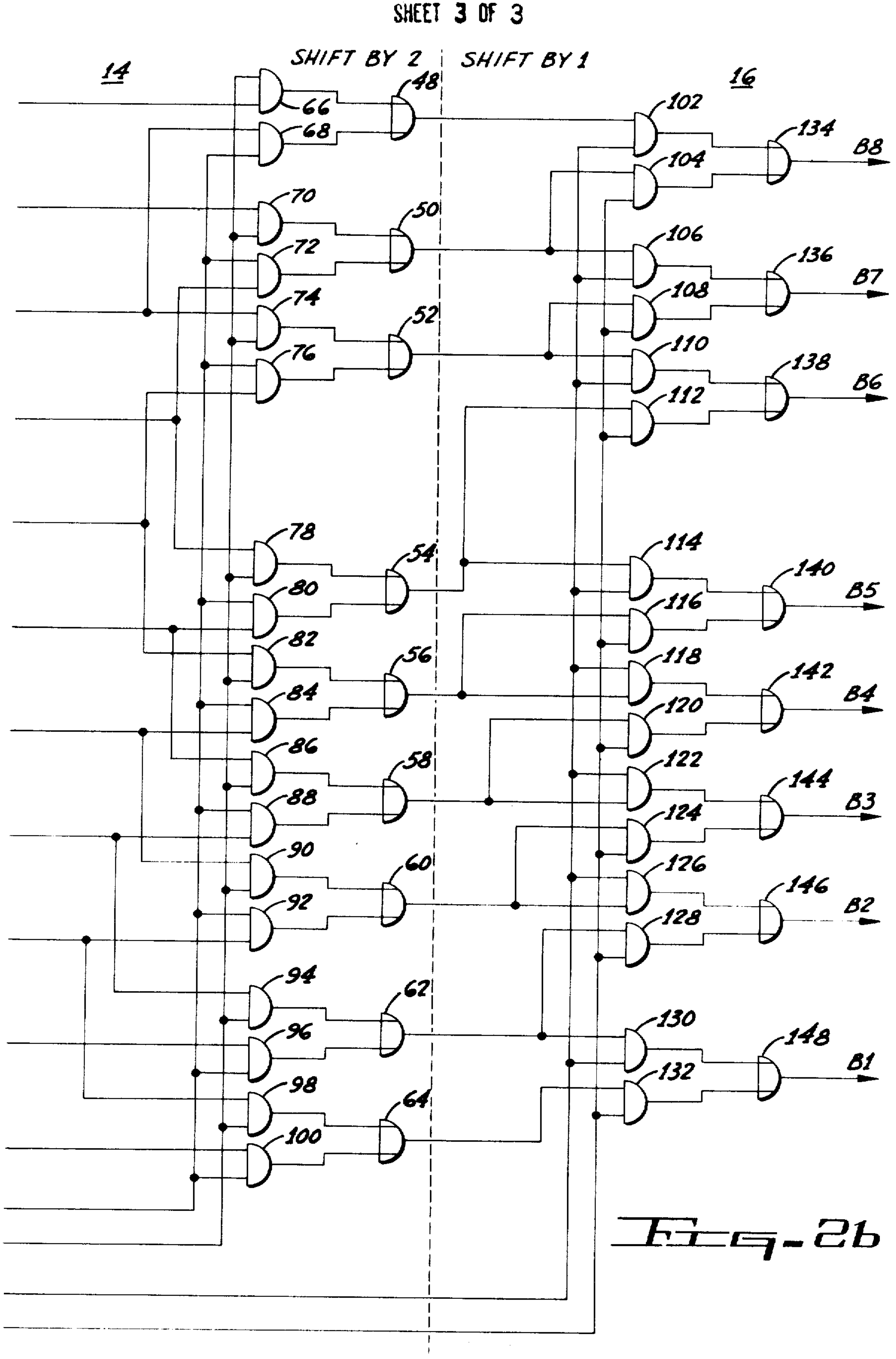

The particular logic configuration for the position scaler block diagram of FIG. 1 is shown in FIG. 2. FIG. 2 comprises two drawings, FIG. 2*a* and 2*b*. These two figures are combined by placing FIG. 2*b* to the right of FIG. 2*a*. The interconnecting lines will match when the figures are placed as described. Reference hereafter will be made only to FIG. 2 and this reference will be to the composite of FIGS. 2*a* and 2*b*.

Referring now to FIG. 2, each of the units shown in FIG. 1 comprise a series of logic AND-gates, logic OR-gates and inverters. The logic components utilized in the different units can be discrete component logic circuitry or of the integrated circuit variety. Positive logic circuitry such as AND-gates and OR-gates is shown in FIG. 2 but it is obvious that by changing the signal levels negative logic circuitry such as NAND and NOR-gates can be substituted without departing from the scope of this invention. As is well known, positive logic circuitry requires a high or enabled signal to activate the circuit and produces the high or enabled signal at the output when activated.

The AND-gate modules disclosed in FIG. 2 provide the logical operation of conjunction for binary "1" or enabled signals applied thereto. A high level signal appears at the output of the AND-gate when, and only when, all of the input signals applied thereto are in their high or enabled state. AND-gates 18 and 20 in FIG. 2 are representative of the AND-gates described.

The OR-gate modules disclosed in the drawings provide the logical operation of inclusive OR for binary 1 or high input signals applied thereto. In this system a high or enabled signal appears at the output of the OR-gate when any one or more of the inputs are in a high or enabled state. OR-gate 26 of FIG. 2 is representative of the OR-gates described.

The inverter modules disclosed in FIG. 2 provide the logical operation of inverting the state of the signal applied to the input of the inverter. Thus a high level or enabling signal appears at the output of the inverter when a low level or disabled signal is applied to the input of the inverter. A low level signal appears at the output of the inverter when the input signal is in a high or enabled state. Inverter 25 of FIG. 2 is representative of the inverters described and shown.

Referring to FIG. 2, the shift selection unit 10 comprises four AND-gates 18–24 and three inverters 25, 27 and 29. The shift selection unit 10 is separated from the other units by a dotted line. The N1 shift selection signal controls the shift by four unit 12. The N2 shift selection signal controls the shift by two unit 14 and the N3 signal controls the shift by one unit 16. The shift right mode or direction signal, shown as the RIGHT or R signal, is directed to one leg of two AND-gates 18 and 20. The other legs of the two AND-gates 18 and 20 are controlled by the N1 signal and the inverted N1 signal, the $\overline{N1}$ signal, via inverter 25. Thus the output of the AND-gate 18 is enabled when the shift right signal is enabled along with the N1 signal. The output signal is shown as R–N1. The output signal of the second AND-gate 20 is shown as R-$\overline{N1}$ and is high or enabled when the right shift signal is enabled but the N1 shift selection signal is not enabled and thus the $\overline{N1}$ signal is high.

The same signals are obtained from the other two AND-gates 22 and 24 except that the shift left mode or direction signal, shown as LEFT or L signal, activates these gates. The other two shift selection signals are directed to their respective shift unit and to an inverter. Thus half the AND-gates in each shift unit are activated by the high shift select signal and the other half are activated by a low shift select signal inverter to enable the AND-gates when the particular shift select signal is not required.

The number of logic gates in each shift unit can be computed by using the formula:

$A = M + P$ and $B = 2A$ where $A$ = number of OR-gates
$B$ = number of AND-gates
$M$ = number of bits
$P$ = number of shift positions following.

Thus for the shift by one unit 16, M is equal to 8 and P is equal to 0, so the number of OR-gates required in the shift by one unit 16 is 8 and the number of AND-gates is 16. For the shift by two unit 14, M is equal to 8 and P is equal to 1, so the number of OR-gates A in the shift by two unit 14 is 9 and the number of AND-gates B is equal to 18. For the shift by four unit 12, M is equal to 8 and P is equal to 3, so the number of OR-gates in the shift by four unit 12 A is 11 and the number of AND-gates B is equal to 22.

The AND-gates are distributed in the first or highest shift unit by using the formula:

$W = M$ $X = M - 1$ $Y = M - R$ $Z = M - 1 - R$ where:

$W$ = number of AND-gates controlling the right shift without a shift selection activation in the unit.
$X$ = number of AND-gates controlling the left shift with an actuated left signal and actuated shift selection signal.
$Y$ = the number of AND-gates controlling the right shift with an actuated shift selection.
$Z$ = the number of AND-gates controlling the left shift with an actuated left shift signal and a disabled shift selection signal.
$M$ = number of bits.
$R$ = number of shift positions performed by unit.

The AND-gates are then combined into pairs by using a truth table showing the resultant shifts performed on the input bits of information. A truth table for use with the eight bits of information according to the preferred embodiment is shown in FIG. 3. FIG. 3 shows the activation of the right signal and left signal, R and L, respectively, on the figure, the activation of the shift signals, N1, N2 and N3, the mode or operation being performed whether right shift, left shift or circular mode, and the information bit position, A1–8 signals ending in the output bit position, B1–8 signals. A dash in the position indicates that the output bit positions will remain in their original reset position and will not be changed. Generally the bit positions are cleared to a low or disabled position prior to any entry from the input. Therefore the bit positions represented by the dash will be a low signal or a 0 if the bit input signal is shifted right or left too far to be stored in any output bit position. In a circular mode the bit positions can be either shifted right or left with the wrap-around feature such that all output bit signals will contain the same information as the input but shifted according to the operation shown in FIG. 3.

Referring again to FIG. 2, the shift by four unit 12 comprises, for the 8 bit scaler of the preferred embodiment, 11 OR-gates each controlled by two AND-gates. The distribution of logic gates in the highest shift unit in the preferred embodiment is computed using the second formula. A group of AND-gates W1–8 control the right shift with a disabled, inverted N1 shift selection signal, $\overline{N1}$ signal. Another group of AND-gates X1–7 control the left shift with each gate being actuated by an enabled left shift signal and an enabled shift selection N1 signal. A third group of AND-gates Y1–4 is controlled by the concurrence of a selected bit signal and an enabled right shift signal along with an enabled shift selection N1 signal. Another group of AND-gates Z1–3 is actuated by the concurrence of selected bit signals along with an enabled left shift signal and a disabled inverted shift selection N1 signal, $\overline{N1}$. In the first unit of the position scaler system, one leg of each of the AND-gates is controlled by the direction signal, either right or left shift, or both right and left signals for a circular mode, and the shift selection signal. This is shown in FIG. 2 by the AND-gates and the shift selection being selectively directed to one leg of each of the AND-gates in the shift by four unit 12.

The AND-gates of the highest shifting unit, the shift by four unit 12 of FIG. 2, are then combined by using the truth table of FIG. 3. Using a shift or no shift signal as directed by the N1 shift selection signal, the outputs of the AND-gates are determined. Thus in the first AND-gate W1 and second AND-gate Y1 on FIG. 2, the first AND-gate W1 has one leg controlled by the $\overline{N1}$ signal and therefore the output signal would still be in the eighth bit position. The second AND-gate Y1 is controlled by a right shift with an actuated shift selection N1 signal and therefore, since the A4 signal will essentially end in the eighth bit position if shifted right four positions, the second AND-gate Y1 essentially has bit position signals placing the output information bit in the eighth bit position. These two signals are essentially common and thus are directed to one OR-gate 26. The same is performed for each of the other combinations directed to all of the remaining OR-gates 28–46.

The number of AND-gates and OR-gates in the shift by two unit 14 can also be determined by the formula previously discussed. In the shift by two unit 14 shown in FIG. 2, the number of OR-gates is equal to the number of bits N plus the number of shift positions following or eight plus one shift position following or nine OR-gates 48–64. The number of AND-gates is twice the number of OR-gates or eighteen AND-gates 66–100. Since all of the shift units after the highest shift unit are not directly controlled by a right or left signal, one AND-gate directed to one OR-gate is controlled by an actuated shift by two or N2 signal and a second OR-gate directed to the first or similar OR-gate is controlled by the $\overline{N2}$ signal. Again using the truth table of FIG. 3, the signals directed to the second leg of the AND-gates are controlled by anticipating whether a shift or not shift is required by the other leg of the AND-gate. Thus in the first and second AND-gates 66 and 68 in the shift by two unit 14, both AND-gates directed to a common OR-gate 48, the first AND-gate 66 has one leg actuated by the disabled shift selection, $\overline{N2}$, signal and thus the other leg is controlled by the eventual eighth bit signal. The second AND-gate 68 is controlled by the actuated shift signal, the N2 signal and thus if a two shift is actuated the sixth bit signal should be directed to this AND-gate to arrive at an eighth bit position. The same criteria is used for directing the signals to the rest of the OR-gate, AND-gate combinations. The shift in this unit is always to the right since no direction signals are directed to this unit.

The same criteria is used to determine the number of logic gates in the shift by one unit 16. The same formula can be used although it is obvious that eight outputs must be obtained since the position scaler system according to the preferred embodiment is an eight information bit system. The signals directed to the AND-gates 102–132 are accomplished by using the same reasoning as that for the other two units. Thus using the truth table of FIG. 3, and realizing that a shift by one can be accomplished in this unit, the first AND-gate 102 is controlled by the eighth bit signal from the OR-gate 48 of the shift by two unit 14 and the disabled shift by one selection signal, the $\overline{N3}$ signal. The second AND-gate 104 has one leg controlled by an enabled shift by one signal, the N3 signal, and thus the other leg of the AND-gate 104 must be controlled by the OR-gate 50 from the shift by two unit 14 having the seventh bit at its output. Again only a right shift is performed by the shift by one unit 16. No direction signals are used to control this unit.

Thus according to the present invention and using the preferred embodiment of eight bits of information, the minimum number of required logic gates can be used by controlling the right and left shift selection in the highest shift unit, the shift by four unit of FIG. 2. A circular shift can be accomplished by actuating both the right and left signals concurrently. The shift selection unit 10 combines the right and left signals with the enabled and disabled N1 shift selection signal. By using the formula and a truth table, the combination of the logic gates can be selected and enabled or disabled selectively by the shift selection unit 10 to accomplish the correct shifting or position scaling of the input information bits to the correct position in the output.

An operation will now be discussed. Referring to FIGS. 2 and 3, and assuming a shift right of two positions, the right signal is enabled, R = 1, the left signal is disabled, L = 0, the N1 and N3 shift selection signals are disabled, N1 and N3 = 0, $\overline{N1}$ and $\overline{N3}$ = 1, the N2 shift selection is enabled for the two position shift, N2 = 1 and $\overline{N2}$ = 0, as shown by the operation that a right two or R2 shift is to be accomplished. The B1 and B2 signals are equal to 0 since no information bits can be shifted right two places into these positions. The A1 input information bit should be eventually positioned in the B3 information bit position on the output.

Referring to FIG. 2, the A1 signal is directed to two AND-gates W8 and Y4. The R-$\overline{N1}$ signal is enabled. The R-N1 signal disables the first AND-gate Y4. The A1 signal along with the enabled R-$\overline{N1}$ signal will actuate the second AND-gate W8 and the OR-gate 40 in the shift by four unit 12. The output of this OR-gate 40 is directed to two AND-gates 88 and 94 in the shift by two unit 14. The N2 signal is enabled and with the A1 signal will enable the AND-gate 88. The output of the AND-gate 88 is directed to the OR-gate 58 whose output in turn is directed to two AND-gates 120 and 122 in the shift by one unit 16. The shift by one selection signal is disabled and thus the $\overline{N3}$ signal is enabled. The A1 signal from the shift by two unit 14 along with the $\overline{N3}$ signal enables the AND-gate 122. This AND-gate 122 is directed to the OR-gate 144 whose output is labeled B3. Therefore enabling a right shift signal with a shift by two, N2, shift selection signal causes the A1 bit information to be transferred to the B3 bit position.

The shift left is performed in a similar manner except that the shift is formed in the opposite direction. For a shift left requirement, the right or R signal is disabled, R = 0, the left or L signal is enabled, L = 1, and the shift selection signals, N1, N2 and N3 are enabled selectively according to the truth table shown in FIG. 3. Thus for a shift left of two, referring to FIG. 3, the N1 and N2 signals are enabled, N1 and N2 = 1, $\overline{N1}$ and $\overline{N2}$ = 0, and the N3 shift selection signal is disabled, N3 = 0, $\overline{N3}$ = 1. Using the truth table and the logic as shown in FIG. 3 a left shift can be followed through the separate units.

A somewhat different operation is performed in the circular mode as shown in the truth table of FIG. 3. For instance if a two shifts in the right direction and six shifts in the left direction is performed in the circular mode, the bits eventually end in the same position as if done separately. Thus in FIG. 3 these operations are shown on the same line. In the circular mode, following the operation of a right two or left six operation, the right signal R is activated, R = 1, the left signal L is activated, L = 1, the N1 and N3 shift signals are disabled, N1 and N3 = 0, $\overline{N1}$ and $\overline{N3}$ = 1, and the N2 shift signal is enabled, N2 = 1, $\overline{N2}$ = 0. The A7 input bit signal should, according to the truth table, become the B1 bit signal in the output.

Referring to the logic diagram of FIG. 2, the A7 signal is directed to three AND-gates W2, X2, and Z2. The first AND-gate W2 is enabled by the high R–$\overline{N1}$ shift signal. The second AND-gate X2 is disabled since the L-N1 signal is disabled. The third AND-gate Z2 is enabled by the L–$\overline{N1}$ signal which is enabled in the shift selection unit 10. The first AND-gate W2 is directed to the OR-gate 28 and in turn directed to one leg of the AND-gate 70 in the shift by two unit 14. The second leg of this AND-gate 70 is disabled by the $\overline{N2}$ signal. The third AND-gate Z2 is directed to the OR-gate 44 in the shift by four unit which in turn is directed to one leg of the AND-gate 96 in the shift by two unit 14. The other input leg of this AND-gate 96 is activated by the N2 signal and thus the AND-gate 96 is activated. The output of the AND-gate 96 is directed to the OR-gate 62. The OR-gate 62 from the shift by two unit 14 is directed to two AND-gates 128 and 130 in the shift by one unit 16. The N3 signal is disabled and thus the second leg of the AND-gate 128 is disabled and no output will occur from this AND-gate 128. The other AND-gate 130 is enabled by the $\overline{N3}$ signal and thus the AND-gate 130 is activated and, via the OR-gate 148, the A7 input bit information signal becomes the B1 output bit information signal as shown in the truth table of FIG. 3.

Although the preferred embodiment discloses a position scaler using eight bits of information, it is obvious that other position scalers could be designed for other bits of information using the design as disclosed for the preferred embodiment. The formula disclosed can be checked for other shifts and number of bits. Using four bits of information and therefore three shifts are required, only the shift by two and the shift by one units are needed. Using the formulas previously disclosed, the shift by two unit requires five OR-gates and ten AND-gates and the shift by one unit requires four OR-gates and eight AND-gates. The truth table of FIG. 3 can be used to connect the AND-gates according to the shift information as previously discussed. The shift selection unit 10 as shown in FIG. 2 can be used replacing the N1 signal by the N2 or shift by 2 shift selection signal. The result will be a position scaler for four bits of information providing a complete right and left shift as well as a complete circular shift.

While the principles of the invention have now been made clear in an illustrated embodiment, there will be immediately obvious to those skilled in the art many modificatons of structure, arrangement, proportion, the elements, materials and components, used in the practice of the invention, and otherwise, which are particularly adopted for specific environments and operating requirements without departing from these principles. The appended claims are, therefore, intended to cover and embrace any such modifications, with limits only of the true spirit and scope of the invention.

I claim:

1. A position scaler for a computer arithmetic unit for shifting position of a number of information bit signals, either right or left with blank information fill, according to right and left shift direction signals and shift selection signals providing the number of shifts required, said position scaler comprising:

a plurality of shift selection units including a highest shift selection unit and one or more lower shift selection units, with the lowest to the highest shift selection units each progressively shifting when activated by its shift selection signal an incrementally higher power of two from a zero power up to and including a power of two which, when combined, gives a number of shifts to place the most significant information bit signal into the least significant bit position and vice versa, the output signals from the shift selection units being directed, in turn, from the highest shift selection unit to the lowest shift selection unit, each of said shift selection units comprising A number of inclusive logic gates and B number of conjunctive logic gates where A is equal to the number of information bit signals plus the number of shift positions following the unit and where B is twice A;

said highest shift selection unit including; a first plurality of conjunctive gates all controlled by the concurrence of the activated right shift signal and a disabled highest shift selection signal and one connected to each of the information bit signals; a second plurality of conjunctive gates all controlled by the concurrence of the activated left shift signal and the activated highest shift selection signal and one connected to each of the information bit signals except the first information bit signal; a third plurality of conjunctive gates all controlled by an actuated right shift signal and an actuated highest shift selection signal and one connected to each of the lower order information bit signals less the number of shift positions performed by the highest shift selection unit; and a fourth plurality of conjunctive gates all controlled by an actuated left shift signal and a disabled highest shift selection signal and connected to each of the lower order information bit signals less the number of shift positions performed by the highest shift selection unit and the first information bit signal, the output signals of two conjunctive gates being directed to one inclusive logic gate according to a truth table of the eventual shifted or not shifted information bit signals;

each of said lower shift selection units shifting in one direction only, one-half of its conjunctive logic gates having one input connected to its activated shift selection signal and one-half connected to its disabled shift selection signal, the output signals from two conjunctive gates being directed to one inclusive logic gate according to the truth table of the eventual shifted or not shifted information bit signals and each conjunctive gate selectively connected to the output signals from the inclusive logic gate of the previous higher shift selection unit, with the lowest shift selection unit providing an output for each of the number of information bit signals.

2. A position scaler as defined in claim 1 wherein both left and right shift direction signals are activated to actuate both said first and second number of conjunctive gates according to the information bit signals to form a circular shift thereby placing the lesser significant digits into more significant positions and vice versa without loss of information bits.

3. A position scaler as defined in claim 1 wherein the number of information bit signals shifted are equal to a power of two and said plurality of shift selection units are equal in number to the power of two.

4. A position scaler is described in claim 1 wherein the number of information bit signals shifted are equal to eight, said plurality of shift selection units are equal in number to three, the highest shift selection unit shifts the information bits four places and the lower shift selection unit shifts the information bit signals two and one places respectively.

5. A position scaler for a computer arithmetic unit for shifting position of a number of information bit signals, either right or left with blank information fill, said position scaler comprising:

a selection unit activated by shifting instructions including a shift direction signal to generate right and left shift signals and shift selection signals, and a plurality of shift selection units including a highest shift selection unit and one or more lower shift selection units, with the lowest to the highest shift selection units each progressively shifting an incrementally higher power of two from a zero power up to and including a power of two which, when combined, gives a number of shifts to place the most significant information bit signal into the least significant bit position and vice versa, the output signals from the shift selection units being directed, in turn, from the highest shift selection unit to the lowest shift selection unit, each of said shift selection units comprising A number of inclusive logic gates and B number of conjunctive logic gates where A is equal to the number of information bit signals plus the number of shift positions following the unit and where B is twice A;

said highest shift selection unit connected to said selection unit and having the information bit signals and highest shift signals selectively directed to its logic gates, wherein its logic gates are distributed such that a first number of conjunctive gates, all controlled by the concurrence of the right shift signal and a disabled highest shift selection signal and one selectively connected to each of the information bit signals, is equal to the number of information bit signals controlled by the position scaler, a second number of conjunctive gates, all controlled by an activated left shift signal and an activated highest shift selection signal, is equal to one less than the number of information bit signals, a third number of conjunctive gates, all controlled by the right shift signal and an actuated highest shift selection signal, is equal to the number of information bit signals less the number of shift positions performed by the highest shift selection unit, and a fourth number of conjunctive logic gates, all controlled by an actuated left shift signal and a disabled shift selection signal, is equal to one less than the number of information bit signals less the number of shifts performed by the highest shift selection unit, the output signals of two conjunctive gates being directed to one inclusive logic gate according to a truth table of the eventual shifted or not shifted information bit signals;

said lower shift selection units shifting in one direction only and having one input of its conjunctive logic gates each selectively connected to said selection unit to receive the shift selection signal and inverted counterpart activating the particular shift selection unit and having one input selectively connected to the output of the inclusive logic gates of the output of two conjunctive gates being directed to one inclusive logic gate according to a truth table of the eventual shifted or not shifted information bit signals and to the next highest shift selection unit in turn, wherein the logic gates in each of the lower shift selection units are distributed such that one-half is controlled by the shift selection signal and one-half by its inverted counterpart and all selectively controlled by the output signals from the previous next higher shift selection unit such that, when two conjunctive gates, one controlled by the shift selection signal and one by its inverted counterpart, are combined in one inclusive gate according to the truth table, all possible eventual shift positions are covered, with the lowest shift selection units providing an output for each of the number of information bit signals.

6. A position scaler as defined in claim 5 wherein both left and right shift direction signals are activated to actuate both said first and second number of conjunctive gates according to the information bit signals to form a circular shift thereby placing the lesser significant digits into more significant positions and vice versa without loss of information bits.

7. A position scaler as defined in claim 5 wherein the number of information bit signals shifted are equal to eight, said plurality of shift selection units are equal in number to three, the highest shift selection unit shifts the information bits four places and the lower shift selection unit shifts the information bit signals two and one places respectively.

8. A position scaler for a computer arithmetic unit for shifting eight information bit signals, either right or left with blank information fill or circular, said position scaler comprising:

a shift selection unit activated by shifting instructions including a shift right and a shift left direction signal and shift selection signals;

a shift by four shift selection unit including twenty-two conjunctive logic gates having an input selectively connected to the information bit signals and having a second input of eight of these conjunctive logic gates controlled by a first signal generated by said shift selection unit comprising the concurrence of the shift right direction signal and an inverted shift by four selection signal, seven conjunctive logic gates controlled by a second signal generated by said shift selection unit comprising the concurrence of the shift left direction signal and a shift by four selection signal, four conjunctive logic gates controlled by a third signal generated by said shift selection unit comprising the concurrence of the shift right direction signal and the shift by four selection signal, and three conjunctive logic gates controlled by a fourth signal generated by said shift selection unit comprising the concurrence of the shift left direction signal and the inverted shift by four selection signal, the output of two conjunctive gates being selectively connected to an input to a two input inclusive logic gate;

a shift by two shift selection unit shifting in one direction only and including eighteen conjunctive logic gates, nine comprising one group having a first input connected to a shift by two selection signal and nine comprising a second group having a first input connected to an inverted shift by two selection signal, and a second input selectively controlled by the output of the inclusive logic gates of the shift by four unit, the output of two conjunctive gates, one from each group, being selectively connected to an input of a two input inclusive logic gate; and a shift by one shift selection unit shifting in one direction only and including sixteen conjunctive logic gates, eight comprising one cluster having a first input connected to a shift by one selection signal and eight comprising a second cluster having a first input connected to an inverted shift by one selection signal, and a second input selectively controlled by the output of the inclusive logic gate of the shift by two unit, the output of two conjunctive gates, one from each cluster, being selectively connected to an input of a two input inclusive logic gate, the output of the inclusive logic gates being the shifted bit information signals;

wherein each of the conjunctive gates in each of the shift selection units are selectively connected to its inclusive logic gates by using a truth table showing the position of the information bit signal after the shift selection unit according to an actuated or not shift selection signal and wherein a circular shift is performed by activating both shift right and shift left direction signals along with shift selection signals.

9. A logical shifting device for binary information bit signals for shifting position of a number of the information bit signals, either right or left or in a circular mode according to right and left shift direction signals, and shift selection signals providing the number of shifts required, said shifting device comprising a plurality of shift selection units including a highest shift selection unit and one or more lower shift selection units, with the lowest to the highest shift selection unit each progressively shifting, when activated by its shift selection signal, an incrementally higher power of two from a zero power up to and including a power of two which, when combined, gives a number of shifts to place the most significant information bit signal into the least significant bit position and vice versa, the output signals from the shift selection unit being directed, in turn, from the highest shift selection unit to the lowest shift selection unit, each of said shift selection units comprising a number of conjunctive logic gates equal to twice the number of information bit signals plus the number of shift positions following the unit, with an input to the conjunctive logic gates of the highest shift selection unit being connected to receive the information bit signals and selectively controlled by the concurrence of the activated left shift signal together with the activated or disabled shift selection signal for the highest shift selection unit or the activated right shift signal together with the activated or disabled highest shift selection signal, said conjunctive logic gates of the lower shift selection units selectively controlled by the activated or disabled shift selection signals for its associated shift selection unit, and each of said shift selection units including means including a truth table to selectively connect the output signals from the higher shift selection unit to an input to the conjunctive logic gates of the next lower shift selection unit, said shift selection units other than the highest shift selection unit shifting in one direction only with a circular mode shift performed by activating both left and right shift direction signals, the output of the lowest shift selection unit being the shifted bit signals.

* * * * *